Feb. 19, 1952 W. W. SLOANE 2,585,971
GEARING
Filed Oct. 11, 1946 5 Sheets-Sheet 3

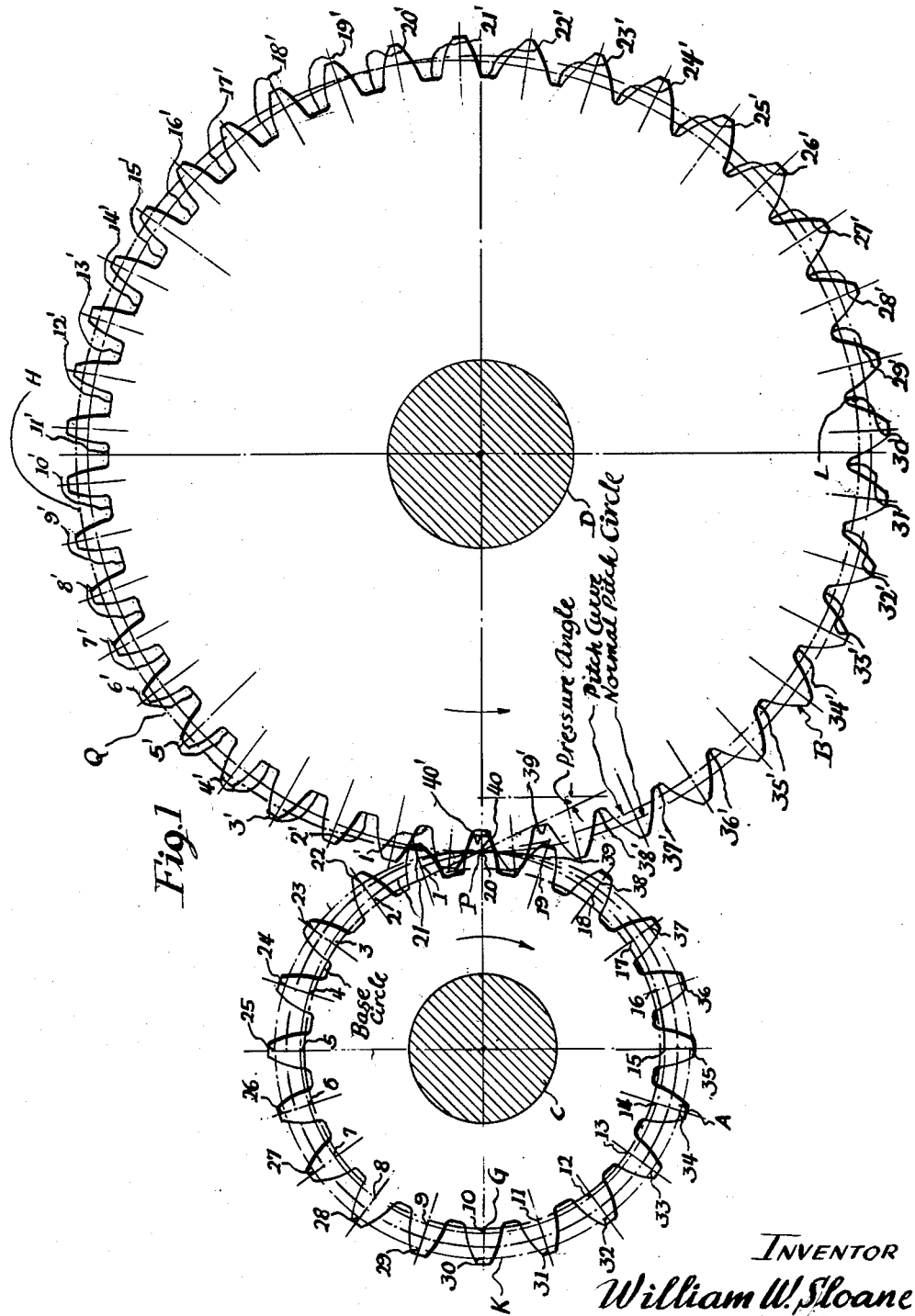

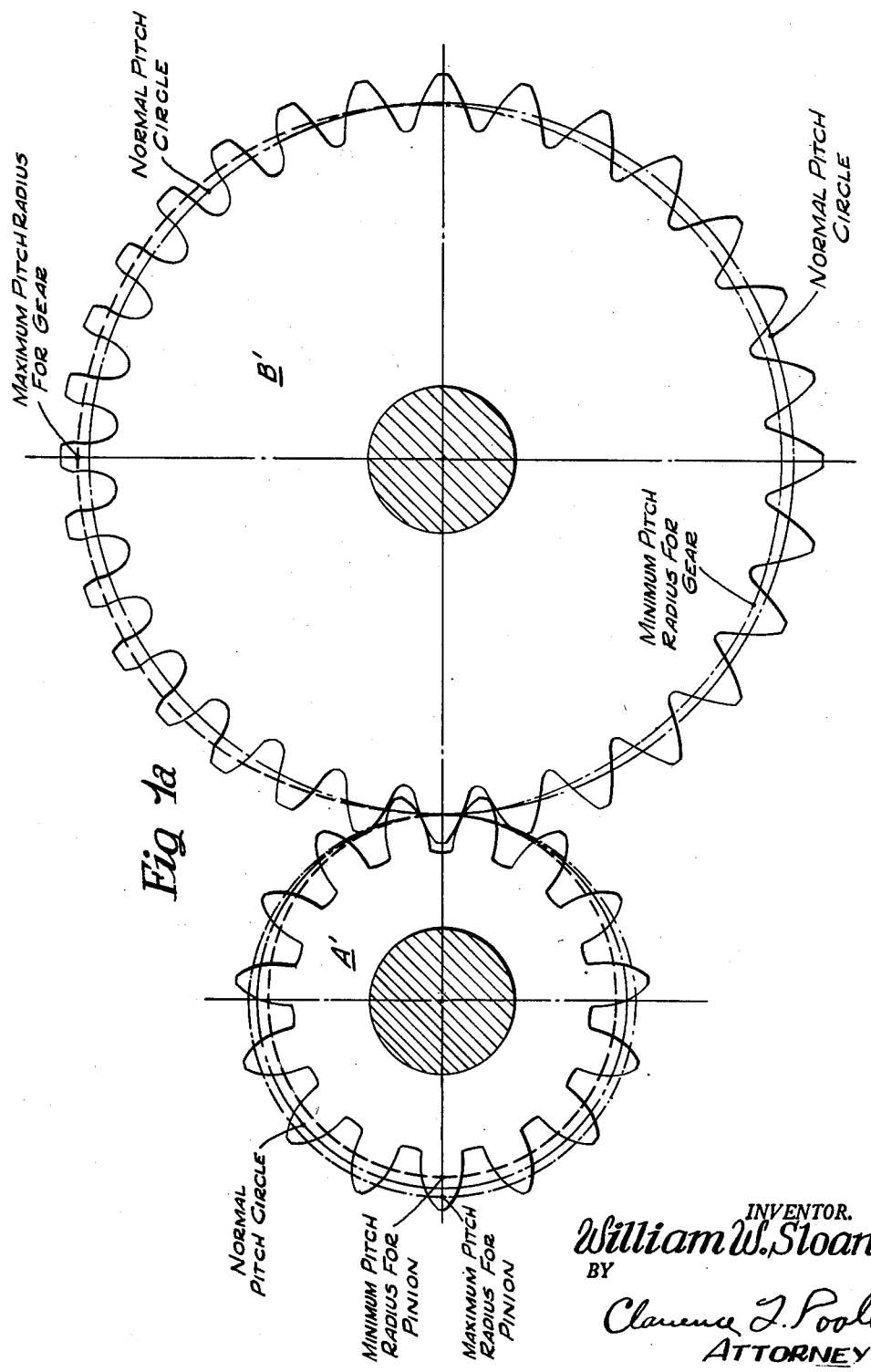

INVENTOR
William W. Sloane
Clarence F. Poole
ATTORNEY

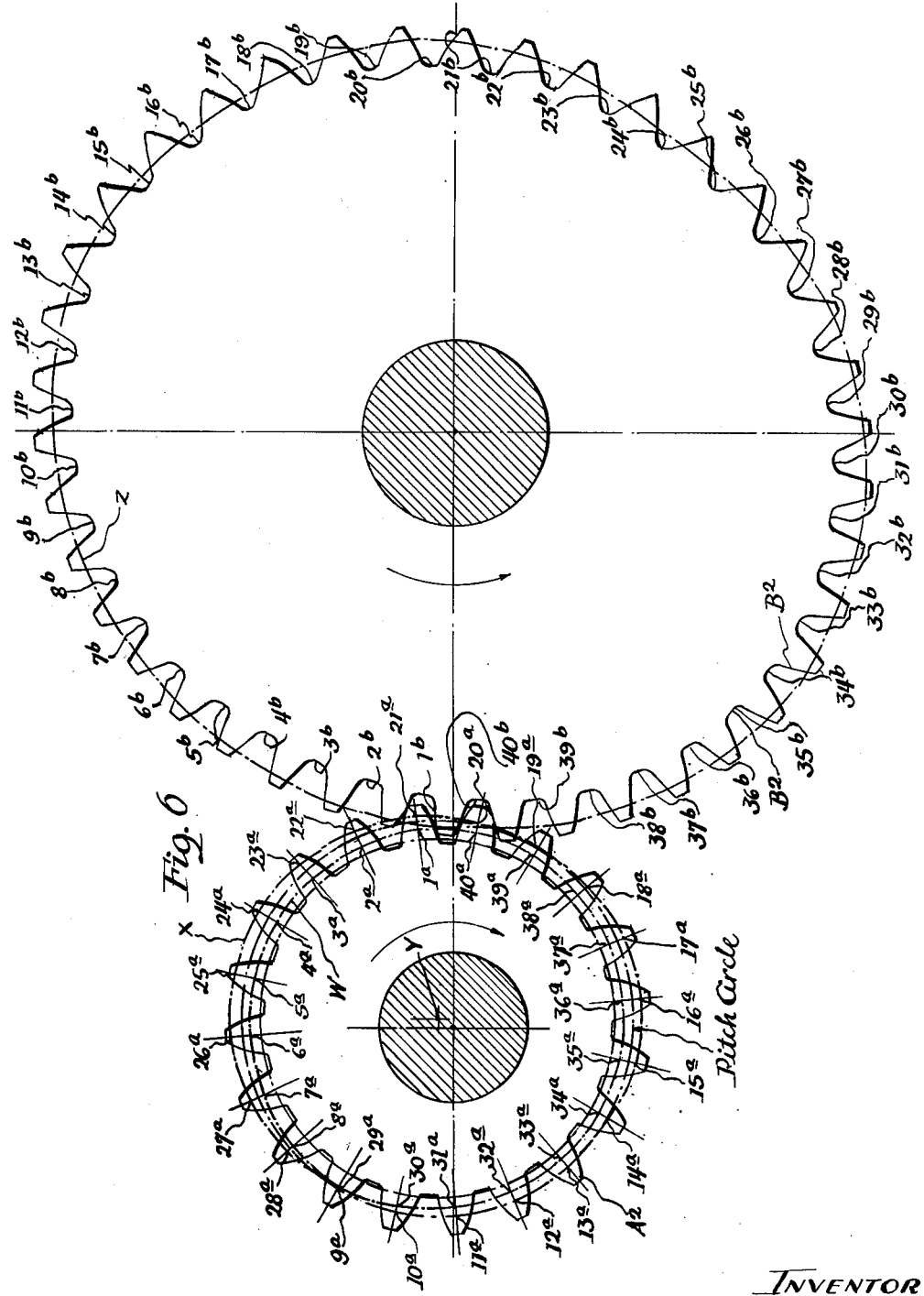

Patented Feb. 19, 1952

2,585,971

UNITED STATES PATENT OFFICE 2,585,971

GEARING

William W. Sloane, Chicago, Ill., assignor to Goodman Manufacturing Company, Chicago, Ill., a corporation of Illinois Application October 11, 1946, Serial No. 702,724

30 Claims. (Cl. 74—462)

This invention relates generally to improvements in varying speed toothed assemblies and has as one of its specific objects to provide a novel form of varying speed gearing in which the speed changing pattern of the gearing varies for each revolution of the pinion until the gear has made one full revolution and is repeated for each full revolution of the gear.

Another object of my invention is to provide a varying speed gear and pinion in which the gear and pinion each have a speed changing influence and in which the speed changing influence of the pinion compounds itself with that of the gear and repeats itself for each revolution of the gear, effecting a resultant speed changing pattern which varies for each revolution of the pinion until the gear has made a complete revolution and repeats itself for each revolution of the gear.

A further object of my invention is to provide a novel form of varying speed gearing in which the speed variations are attained by modifying the gear teeth so the pinion teeth may contact the gear teeth along contact lines which cross the common center line of the gear and pinion at varying points with respect to the tips and roots of the teeth of the gear and pinion.

It is frequently desirable to have a shaft rotating at speeds which vary during one revolution, with the pattern of speed variations repeated with each revolution. This pattern may be regular as in the case of two meshing elliptical gears. Where elliptical gears are used, however, the average speed ratio between the two shafts is always 1 to 1, and it is oftentimes desirable to combine a speed reduction between the two shafts in addition to the speed variation. This cannot be accomplished with elliptical gears.

It is well known that in standard involute gears and pinions the pitch circle of the gear is usually located radially in the center of the meshing part of the tooth so that when the teeth are in full mesh, the addenda and dedenda are the same, that is the pitch circles will be equal distances from the ends of the teeth of both gears. There have, however, been departures from this standard which are called the long and the short addendum gears, in which the pitch circle is moved closer to the ends of the teeth of one gear and farther away from the ends of the teeth of the other gear. As used herein, the term "addenda" refers to the heights of teeth above the pitch curve or line while the term "dedenda" refers to the depths of teeth spaces below the pitch curve or line in accordance with the usual definitions of these terms.

Heretofore, whenever the pitch circle has been moved from its standard location, the new location of the pitch circle has been maintained throughout the entire circumference of the gear. In my present invention, however, I vary the pitch circle throughout the entire circumference of the gear and thus attain a varying speed when the gear is driven from a standard pinion.

Furthermore, where the pattern of speed variations for each revolution of the pinion is similar, but not necessarily the same, the permissible variations in speed may be increased by mounting the pinion eccentrically. The influence of the eccentric mounting is repeated with each revolution of the pinion, but variations from this may be obtained in the same manner as from a concentrically mounted pinion. With an eccentrically mounted pinion and a gear driven thereby which has an irregular pitch curve, the speed change pattern of the pinion is compounded with that of the gear and the periphery of the gear does not follow any regular curve, as with a concentrically mounted pinion, but must be designed to provide proper tooth clearance for the pinion.

In carrying out one form of my invention I may obtain a speed reduction as well as a speed variation, by varying the pitch circle of the gear throughout its circumference according to the needs for speed variation, so that the varying pitch circle becomes a pitch curve instead of a pitch circle. This gear and speed reduction further differs from previous gear sets of the character in which the speed changing pattern is repeated for each revolution of the pinion rather than for each revolution of the gear, in that the speed variations during one revolution of the pinion need not necessarily be repeated for the following revolutions of the pinion, until the gear has made one complete revolution.

These and other objects of my invention will appear from time to time as the following specification proceeds and with reference to the accompanying drawings wherein:

Figure 1 is a view of a meshing concentric gear and pinion constructed in accordance with my invention;

Fig. 1a is a view, similar to Fig. 1, of another meshing concentric gear and pinion and differs only in the specific number of teeth employed and in the specific speed variation obtained.

Figure 6 is a view of a meshing gear and pinion constructed in accordance with my invention, showing the pinion eccentrically mounted and meshing with a variable speed gear.

Figure 2:
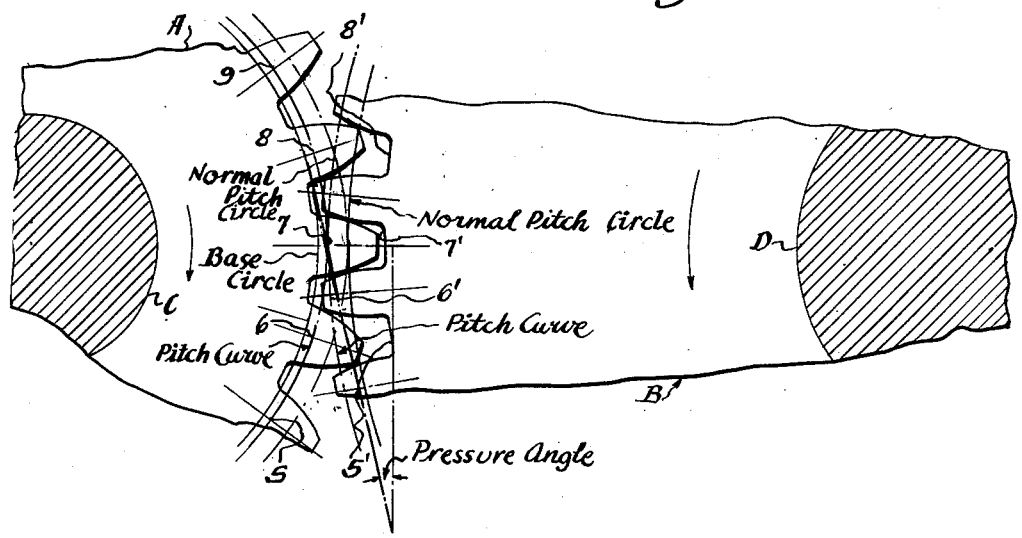
Figure 2 is a fragmentary enlarged view showing the gear and pinion meshing at the point of the highest speed ratio.

In Figures 1, 2, 3, 4 and 5 of the drawings a pinion A, rotatable about its center, is shown as meshing with and being driven with a gear B, which is also rotatable about its center and has a circular outer periphery. Said gear and pinion are herein shown as being spur gears, but may be helical or bevel gears as well. Said pinion is herein shown as being a standard 25° pressure angle, 20-tooth, 3-pitch involute spur pinion, and may be mounted on a shaft C which may be driven at a constant speed. Said gear may be mounted on a shaft D for driving said shaft at a varying speed, and is shown as having 40 teeth of an irregular form generated to suit the desired varying speeds, as will hereinafter more clearly appear as this specification proceeds.

It should be understood, however, that my invention is not limited to involute forms of gear teeth and may pertain to the various forms of gear teeth known at the present time, and that it also is not limited to speed ratios in which the gear teeth are even multiples of the pinion teeth. Also, if desired, the pinion A may be mounted on a shaft rotating at a varying speed and the gear B may correct the variation in rotation of the shaft C, so as to drive its shaft at a constant speed of rotation. Moreover, the gear may be driven at a constant speed of rotation, or may be driven at a varying speed of rotation and drive another gear or pinion at a constant speed of rotation, or the pinion may be driven at a varying speed of rotation and the gear may be a varying speed gear and drive its shaft at a varying speed of rotation different from that of its drive pinion.

For the purpose of illustrating one form of my invention in the simplest manner possible, consider that a variation in speed ratio can be attained with a pitch radius variation equal to two-thirds of the working depth of the tooth. The standard pitch radius of a 3-pitch 20-tooth pinion is 3⅓ inches. The standard pitch radius of the meshing gear is 6⅔ inches, and the working depth of the teeth of the gear and pinion will be ⅔ inches. The permissible variation in pitch radius will thus be ⅔ of ⅔ inches, or 4/9 inches. This variation in pitch radius will be 2/9 inches larger and 2/9 inches smaller than the standard pitch radii of the gear and pinion.

The value of the smallest pitch radius on the pinion will therefore be 3⅓ inches minus 2/9 inches, or 3 1/9 inches. This is designated by point G in Figure 1 of the drawings. The pitch radius of the gear at the point of maximum speed ratio is designated by reference character H in Figure 1 and will be 6⅔ inches plus 2/9 inches, or 6 8/9 inches. From the foregoing it is clear that the speed ratio when working with the smaller pitch radius on the pinion, will be 6 8/9 divided by 3 1/9, or 2.214 to 1.

When working with the largest pitch radius on the pinion the value of the pitch radius on the pinion will be 3⅓ inches plus 2/9 inches, or 3 5/9 inches. This is designated by point K in Figure 1 of the drawings. The pitch radius of the gear for the largest pitch radius on the pinion is designated by reference character L on Figure 1 and will be 6⅔ inches minus 2/9 inches, or 6 4/9 inches. The speed ratio will then be 6 4/9 divided by 3 5/9, or 1.812 to 1. The higher speed ratio will thus be 22% more than the lower speed ratio.

Since the pinion rotates twice for each revolution of the gear and since the maximum and minimum speed ratios may occur on the same tooth of the pinion, the speed change pattern of the gear will be different for each of the two revolutions of the pinion. The pitch curve of the pinion will also be different for its two revolutions, which in the form of my invention illustrated in Figure 1 will equal one complete revolution of the gear. It is readily apparent that the pitch curve of the pinion may be different for more or less than two revolutions of the pinion according to the average speed ratios between the gear and pinion.

It should here be understood that by varying the pitch curve of the pinion over the range just described, that the fewer the number of teeth in the gear and pinion the greater will be the range of speed ratios, but that the tooth contact angle will be reduced as the number of teeth in the gear and pinion is reduced.

It should further be noted that while the changes in the pitch radius are gradual in the present illustration, that these changes may be more abrupt to attain more abrupt speed variations, but that they ordinarily should not be made so abruptly that the contact point on the driven tooth fails to advance towards the base of the tooth. The physical limit in changes in pitch radius is where the tooth contact point remains stationary, but as this would result in a ridge on the face of the tooth, the tooth would have poor wearing properties. Therefore, in practice, the rate at which the pitch radius can be varied should be limited to what will give a tooth curvature that will have suitable wearing properties. Figure 1a illustrates about the limiting condition, as minor ridges are already being formed on some of the narrow teeth on the large gear B.

If it is desired to design a set of gears which will provide a predetermined varying velocity relative to time for a uniform pinion velocity, a curve can be plotted with time as a base and with the vertical ordinate representing gear speed ratios. Since the pinion rotates at a uniform angular velocity, the pinion angles can be expressed along the base line of the curve, and the vertical ordinate, when multiplied by the proper constant, will give the speeds of the gear. An illustrative form of curve from which the pitch curves of the pinion A and gear B have been determined, is illustrated in Figure 5.

The pitch radius points on the pitch curve of the pinion can be determined for any angular position of the pinion by multiplying the distance between the centers of the gear and pinion by the speed ratio as determined from the curve and by dividing this by 1 plus said speed ratio.

The corresponding point on the pitch radius of the gear will then be the distance between the centers of the gear and pinion minus the pinion radius. The angular location of this pitch radius point on the gear can be determined by measuring the area of the curve from the staring point to the pinion position being considered, and by multiplying this area by a suitable constant determined by the scale of the ordinates and abscissae of the curve.

Figure 5:
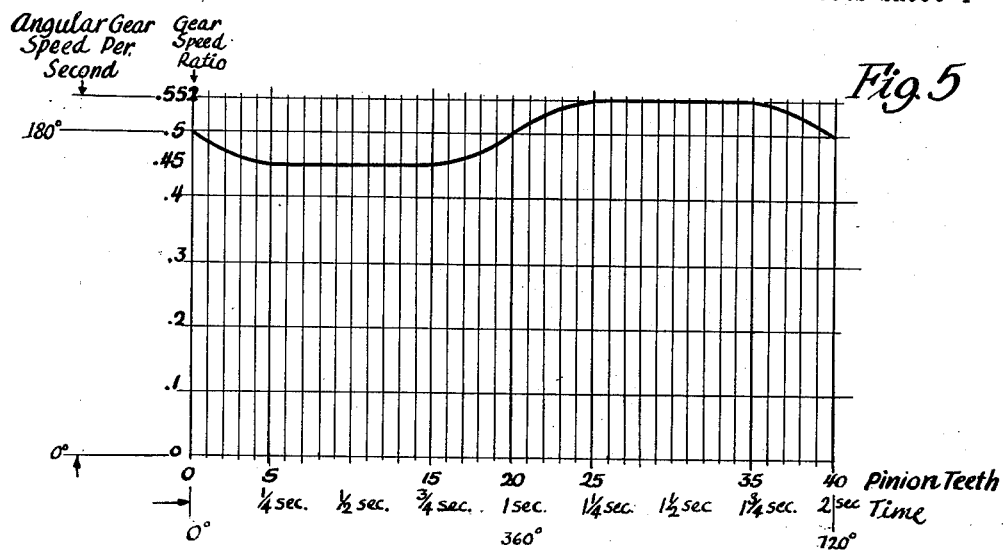
Figure 5 is a velocity diagram showing the speed ratios between the gear and pinion illustrated in Figures 1, 2, 3 and 4.

In referring to the illustrative form of my invention shown in Figures 1 and 5 of the drawings, it may be seen that the pitch curve of the pinion A intersects its normal pitch circle at the 20th tooth of said pinion, as indicated by P in Figure 1. From this point said pitch curve curves gradually inwardly towards the base of said pinion and may be an arc of a circle concentric with the center of said pinion, which extends from the 5th to the 15th teeth of said pinion and through the point G, as shown in Figure 1. At the 15th tooth of said pinion said pitch curve gradually curves outwardly towards the pitch circle of said pinion and crosses said pitch circle at the point P. From thence said pitch curve gradually curves outwardly towards the outer periphery of said pinion and may be an arc of a circle concentric with the center of said pinion at the 5th tooth of said pinion. Said tooth will mesh in the 25th space between the teeth of said gear, and in Figure 5 is designated as the 25th tooth of said pinion. Said arc extends through the point K and extends from the teeth of said pinion which mesh with the 25th to 35th spaces between the teeth of said gear and designated as the 25th to 35th pinion teeth in Figure 5. From the 35th tooth of said pinion as shown in Figure 5, said pitch curve will gradually curve inwardly towards the pitch circle of said pinion, and will cross said pitch circle at the point P.

This curve thus forms a continuous pitch curve for the pinion for its two revolutions and for the one revolution of the gear. The pitch radius points for the pinion teeth for its two cycles of rotation corresponding with the spaces between the teeth of the gear, are designated by reference characters 1 to 40, starting with the first tooth of the pinion from the point P and going in a counterclockwise direction.

The pitch curve of the gear B is designated by reference character Q and is determined by finding the pitch radius points on the gear corresponding with the pitch radius points on the pinion, and in locating these points in the proper angular relation with respect to said pitch radius points on said pinion, as was hereinbefore described when referring to the speed ratio curve shown in Figure 5. The spaces between the teeth of said gear corresponding with the meshing teeth and pitch radius points of the pinion are numbered from 1' to 40'.

For further illustrations of pitch curve variations in concentric gear and pinion arrangements, see Fig. 1a.

The pressure angles are determined from the base circle and pitch curve of the pinion; as for example, the pressure angle for any point on the pitch curve of the pinion may be determined by drawing a line tangent to the base circle of the pinion and extending through the point where pitch curves of the gear and pinion intersect the common center line between the gear and pinion. The pressure angle is thus the angle between said line and a line perpendicular to the common center line between the two gears.

Figure 3:
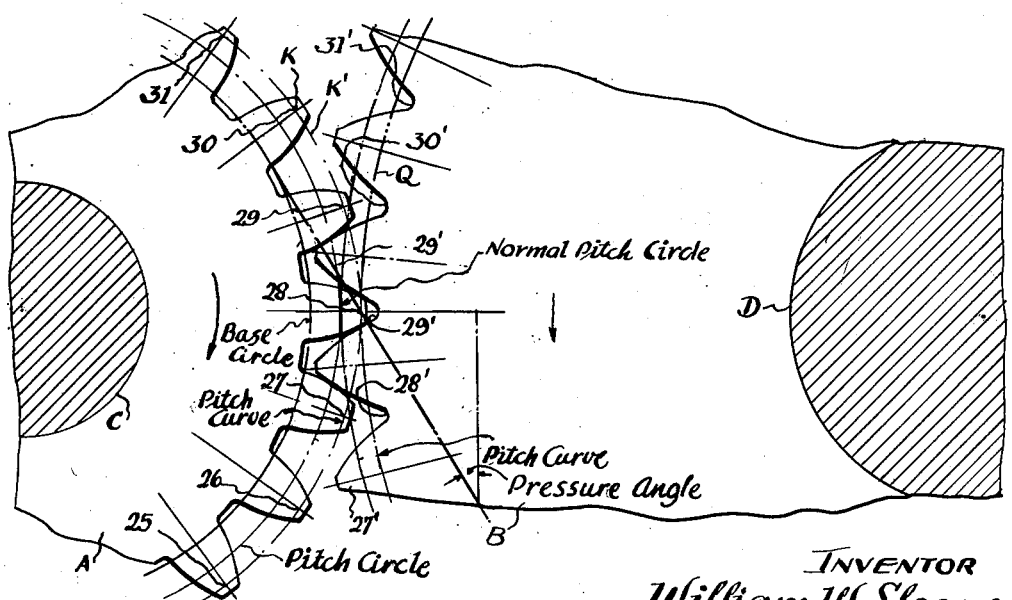
Figure 3 is a fragmentary enlarged view showing the gear and pinion meshing at the point of the lowest speed ratio.
Figure 4:
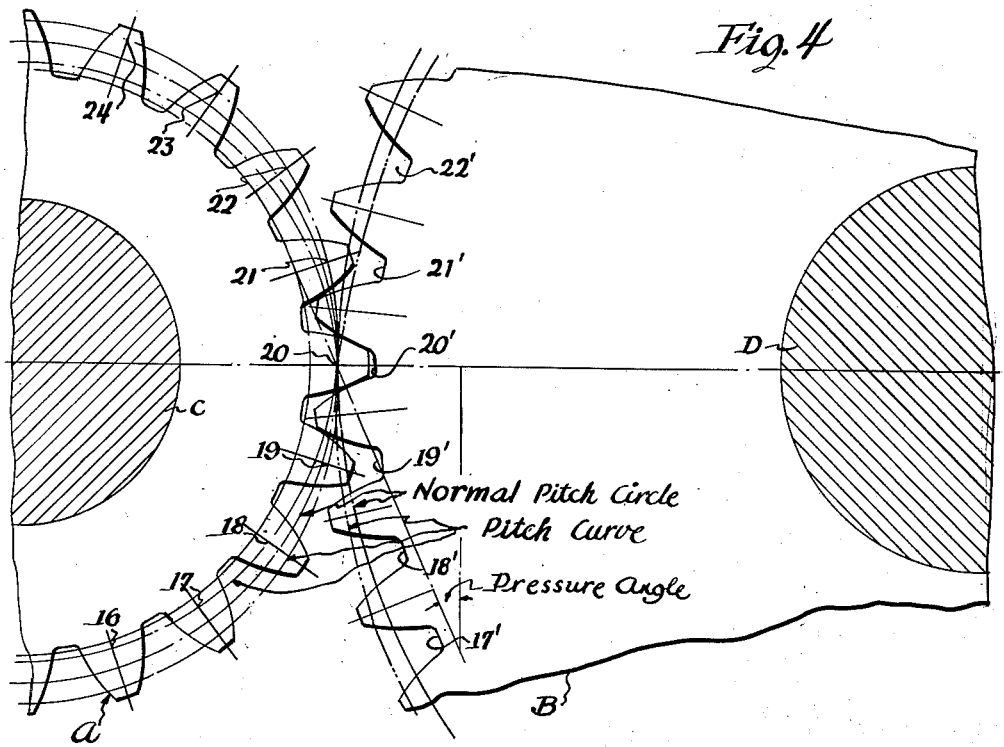
Figure 4 is a fragmentary enlarged view showing the gear and pinion meshing after the pinion has made one full revolution from the position shown in Figure 1.

It should be noted in comparing Figures 1, 2, 3 and 4 that in Figure 2 showing the gear and pinion meshing near the point of the smallest pitch radius on the pinion, the pressure angles are relatively low, but are a substantial amount above a zero pressure angle. Also, in Figure 3, showing the gear and pinion meshing near the point of the largest pitch radius of the pinion, the pressure angles between the gear and pinion at this portion of the cycle of rotation of said gear are relatively high. In Figures 1 and 4, the pressure angles between the pinion and gear are at still different values.

Since the pinion A is a standard pinion, it may be cut or generated from a circular gear blank with a pinion-shaped cutter. The gear B may also be cut or generated with a pinion-shaped cutter from a circular blank. The cutter should have the same number of teeth as the pinion and a master gear may be fastened on the gear blank and rotate the gear blank with respect to the cutter at the same speed ratio at which the finished gear and pinion are to operate. The method of cutting said gear is the subject matter of a separate application for patent, so need not further be shown or described herein.

The profiles of the teeth of the gear B are not developed from a base curve, and one simple manner in which the profiles of the teeth of the gear B may be drawn is from a full size template exactly like the pinion A. Said template may of course be larger than full size with resultant larger gear teeth, where it is desired to increase the accuracy of the tooth profiles and the ease with which they may be studied. Said template may be mounted on a piece of drawing paper on a drawing board for rotation about a fixed vertical axis. Radial lines extending from the center of rotation of said template and representing increments of angular travel of the pinion may then be laid out on the sheet of drawing paper on which said template is mounted. A sheet of paper representing the gear blank may also be mounted on the drawing board for turning movement about its center. Radial lines may be laid out on this sheet of paper from its center, representing increments of angular travel of the gear during travel of the pinion from one radial line to the next. The radial lines representing angular travel of the gear are angularly located in the same manner the pitch radius points of the gear are located. The outlines of the teeth of the pinion at the points where they would mesh with corresponding teeth of the gear may then be traced around the teeth of the pinion template on the sheet of paper representing the gear blank. The pinion may then be pivoted from one radial line to the next. The paper representing the gear blank may also be turned from one radial line to the next, representing the amount of angular travel of said gear blank upon travel of the pinion from one radial line to the next. The teeth of the pinion then may again be traced from this template. This operation may be continued until the profiles of all of the teeth of the gear have been drawn.

In Figure 6 a pinion $A^2$, mounted eccentrically of its center, is shown as meshing with a varying speed gear $B^2$ so as to increase the permissible speed variation of the gear over that shown in Figure 1. Said pinion $A^2$ is herein shown as being a standard 25° pressure angle 20-tooth 3-pitch involute spur pinion like the pinion A in Figure 1, but is mounted for rotation about an axis eccentric of its center a distance determined by the speed change pattern desired. Because the pinion is eccentric of its center, the periphery of the gear $B^2$ does not follow any regular curve but is so formed as to provide proper tooth clearance for the pinion.

The tooth forms of the teeth of the gear $B^2$ may be generated from a pinion-shaped cutter having the same number of teeth as the pinion $A^2$, mounted with the same degree of eccentricity as said pinion. Said gear may be cut with said pinion-shaped cutter in a manner similar to which the gear B is generated except that the cutter is mounted eccentrically of its center. Unlike the gear B meshed with the concentric pinion A, the teeth of the pinion $A^2$ and gear $B^2$ should be meshed in the same relation as they were cut and the average speed ratio between the two shafts must be such that it can be expressed by a whole number.

The pitch curve of the pinion $A^2$ for its two revolutions is determined like the pitch curve of the pinion A. Said pitch curve is indicated by reference character W for the first revolution of the pinion and the pitch radius points on said pitch curve for each tooth of the pinion are designated by numerals $1a$ to $20a$. The pitch curve of said pinion $A^2$ for its second revolution is designated by reference character X and the pitch radius points on said curve for each tooth of said pinion are indicated by reference numerals $21a$ to $40a$. The spaces between the teeth of the gear $B^2$ meshed with the teeth of said pinion are indicated by reference numerals $1b$ to $40b$.

The pitch curves W and X of the pinion $A^2$ for its two revolutions may be determined from a desired velocity or speed ratio curve similar to the curve shown in Figure 5. As, for example, where it is desired that the gear $B^2$ drive a mechanism at a varying velocity corresponding to a desired angular velocity or speed ratio curve, the desired instantaneous velocity of the mechanism to be driven by the gear may be found for any point on the curve. The required angular velocity of the gear $B^2$ may thus be found for any corresponding position of the gear. The ratio between the gear and pinion speeds at any point in the cycle of rotation of the gear may be obtained by dividing the pinion speed by the desired speed of the gear. The pitch radius points of said pitch curve W and X may then be determined in the same manner the pitch radius points for the pinion A were determined.

The degree of eccentricity of the pinion A may be determined from its pitch curve plotted for its two revolutions along radial lines extending from the center of rotation of said pinion. A compass may then be set to the standard pitch circle of the pinion, and a circle may be described which as nearly as possible approximates the irregular pitch curve. The center of this circle will be the true center of the pinion and is indicated by reference character Y in Figure 6. The maximum distances from the true pitch circle of the pinion to the pitch curve should be substantially the same on the outside of the pitch circle as on the inside of the pitch circle. Variations from this, however, may be made one way or the other from the true pitch circle of the pinion to improve the shapes of the teeth.

The pitch curve of the gear $B^2$ is indicated by reference character Z and may also be found from the pitch curve W and X of the pinion in the same manner as the pitch curve for the gear B was found.

The profiles of the teeth of the gear $B^2$ may be drawn from a template like the pinion $A^2$ in much the same manner the profiles of the teeth of the gear B may be drawn. The template is mounted with the same degree of eccentricity as said pinion $A^2$ and its center of rotation should be located on the common center line between the gear and pinion. The location of the true center of the pinion may be found in the hereinbefore described manner and is herein shown as being located 60° from the common center line of the gear and pinion taken in a counterclockwise direction from said common center line, when beginning the outline of the first tooth of the gear. From this point on, the profiles of the teeth of the gear $B^2$ may be drawn in the same manner the profiles of the teeth of the gear B are drawn.

If in the design of ordinary gears, a line should be drawn tangent to the base circle of the pinion through the pitch point of the gear and pinion, it would be tangent to the base circle of the gear. This, however, is only a momentary condition with the varying speed gearing of my invention, and as the angle and position of such a line varies, the circle on the gear to which it would be tangent will vary. With a varying speed gear having regular speed variations as shown in the gear speed ratio curve in Figure 5, a curve drawn through these points of tangency may form a regular base curve, but where the speed variations are more abrupt, like the gear in Figure 6, this curve may be of such an irregular nature that the lines drawn through the pitch points and tangent to the base circle of the pinion would not be tangent to this curve, and the gear could have no regular base curve or circle.

It may be seen from the foregoing that according to my invention, varying speed sets of gears may be produced with round gear and pinion blanks and a concentric pinion, and with a round pinion blank mounted eccentrically of its center and an irregularly shaped gear blank. It may further be seen that in the case of both the concentric and the eccentric pinion, the pinion teeth may be teeth of any standard form, and that except for the eccentricity of the pinion where the pinion is eccentrically mounted, the speed variations have been attained by modifying the gear teeth so the relative pitch radius points vary with respect to the tips and roots of the teeth of the gear and pinion.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiments illustrated, in this case gearing, excepting as it may be limited in the appended claims.

I claim as my invention:

1. A varying speed gear adapted to mesh with a pinion of standard tooth form, said gear being rotatable about its center and having a circular outer periphery and a non-circular pitch curve, varying with respect to said circular outer periphery and being continuous across adjacent gear teeth.

2. A varying speed gearing including a gear and a pinion rotatable about fixed axes and driving said gear, said pinion having spaced continuous non-coincidental pitch curves which are repeated for the several revolutions of said pinion, said gear having a continuous non-circular pitch curve varying with respect to the periphery of the gear and when driven by said pinion producing a speed change pattern which varies for the several revolutions of the pinion and is repeated for each full revolution of the gear.

3. A varying speed gearing including a pinion rotatable about a fixed axis concentric with its center and a gear meshed with said pinion and rotatable about a fixed axis concentric with its center, said pinion having spaced continuous non-coincidental pitch curves which are repeated for the several revolutions of said pinion, the outer peripheries of the teeth of said gear being formed on a circle concentric with the center of said gear, and the pitch curve of said gear being continuous and non-circular and varying with respect to the periphery of the gear and when driven by said pinion producing a speed change pattern which varies for the several revolutions of the pinion and is repeated for each full revolution of the gear.

4. A varying speed gearing including a standard pinion rotatable about a fixed axis and a gear meshing with and driven by said pinion and mounted for rotation about a fixed axis, said pinion having spaced continuous non-coincidental pitch curves which are repeated for the several revolutions of said pinion, the teeth of said gear being an even multiple of the teeth in said pinion and the pitch line of the teeth of said gear forming a non-circular continuous pitch curve varying with respect to the periphery of said gear and when driven by said pinion producing a varying speed change pattern which varies throughout each full revolution of said gear and is repeated for each successive revolution of said gear.

5. A varying speed gearing including a pinion rotatable about a fixed axis eccentric of its center and a gear meshing with and driven with said pinion and monuted for rotation about a fixed axis, the pitch radius points of said gear forming a continuous non-circular pitch curve which varies with respect to the periphery of said gear and when driven by said pinion produces a speed change pattern which varies for successive revolutions of the pinion and throughout each full revolution of said gear and is repeated for each full revolution of said gear.

6. A varying speed gearing including a pinion rotatable about an axis eccentric of its center and a gear driven by said pinion at a reduced varying speed, the teeth of said gear being an even multiple of the teeth in said pinion and the pitch radius points of the teeth of said gear forming a continuous non-circular pitch curve which varies with respect to the periphery of the gear, and the varying speed change influence of said pinion compounding itself with the speed change pattern of said gear and the speed change pattern of said gear extending throughout each full revolution of said gear.

7. A varying speed gearing including a pinion rotatable about a fixed axis eccentric of its center and a gear rotatable about a fixed axis and driven with said pinion and having a non-circular outer periphery, the pitch radius points of the teeth of said gear forming a non-circular continuous pitch curve which varies with respect to the periphery of said gear, the speed change influence of said pinion repeating itself for each revolution thereof and compounding itself with that of said gear, and said gear and pinion producing an angular speed change pattern which varies for the several revolutions of said pinion until said gear has made one complete revolution and repeats itself for each full revolution of said gear.

8. A drive combination of varying speed gears including a gear and a pinion meshing therewith, said gear and pinion being rotatable about axes concentric with their centers and having circular outer peripheries concentric with their axes of rotation, said gear having a continuous non-circular pitch curve which varies with respect to the periphery of said gear and produces a varying speed for the several revolutions of the pinion until the gear has made one complete revolution and is repeated for each successive full revolution of said gear.

9. A drive combination of varying speed gears including an eccentric pinion and a gear meshed therewith and when driven thereby producing a varying speed which varies throughout each full revolution of said gear, said gear and pinion being so arranged that any points of contact on the several meshing teeth shall have their own pressure angles determined from continuous non-circular pitch curves of said gear and pinion, which vary with respect to the peripheries of said gear and pinion.

10. A drive combination of gears including an eccentric pinion and a varying speed gear meshed therewith and driven thereby, said gear having a non-circular continuous pitch curve varying with respect to its outer periphery and when driven by said pinion producing a speed variation which varies upon revolution of the pinion until the gear has made one complete revolution and will be repeated for each successive full revolution of the gear.

11. A drive combination of varying speed gears for producing a uniform speed from a varying speed including two meshing gears rotatable about axes concentric with their centers and having circular toothed peripheries, one of said gears having a continuous non-circular pitch curve varying with respect to its toothed periphery.

12. A drive combination of varying speed gears including two meshing gears, one of which is adapted to drive the other at increased varying speeds, said gears being so developed that the several meshing teeth shall have different pressure angles determined from continuous non-circular pitch curves of said gears and the base circle of one of said gears.

13. In a gear train, a circular pinion of standard tooth form having a non-circular pitch curve which is continuous and variable in radius for at least one revolution of said pinion, said non-circular pitch curve varying with respect to the extremities of the teeth of said pinion, said pinion having a varying circular pitch, and a gear meshing with said pinion having a non-circular pitch curve varying with respect to the extremities of the teeth of said gear, said gear having a varying circular pitch.

14. In a gear train, a pinion of standard involute tooth form having teeth, the extremities of all of said teeth lying in a circle, said pinion having a non-circular pitch curve which is continuous and in radius for more than one revolution of said pinion, and a gear meshing with said pinion having a varying non-circular pitch curve varying with respect to the tips of the teeth of said gear, said gear having a varying circular pitch.

15. In a varying speed gear train, a pinion rotatable about an axis and having varying curvilinear pitch and varying pitch radius and non-coincidental connected pitch curves which are spaced from each other and which intersect the teeth of said pinion at points spaced from each other, and a gear meshing with said pinion having varying curvilinear pitch and varying pitch radius and a non-circular pitch curve which varies with respect to the periphery of the teeth thereof, said gear and pinion being so constructed and arranged as to produce a speed change pattern which varies for the several revolutions of the pinion and is repeated for each full revolution of the gear.

16. A drive combination of varying speed gears including a gear and a standard tooth form pinion meshing therewith, the pitch curve of said gear being in the form of a non-circular continuous pitch curve, and the pitch curve of said pinion intersecting the teeth of said pinion at points spaced along any tooth of said pinion, and the pitch curve of said pinion varying for each revolution thereof until the gear has made a complete revolution.

17. A gear train comprising a gear having uniformly shaped teeth and uniform circular pitch measured at a common distance from the tip of each tooth thereof, and a second gear having a multiplicity of tooth shapes and having different circular pitches measured at a common distance from the tip of each tooth.

18. A gear train comprising a gear having uniformly shaped teeth and uniform circular pitch measured at a common distance from the tip of each tooth thereof, and a second gear having a multiplicity of tooth shapes and having different circular pitches measured at a common distance from the tip of each tooth, both of said gears operating on pitch curves which vary with respect to the periphery of the teeth of said gears.

19. In a varying speed gear train, a gear and a meshing pinion rotatable about fixed axes, said gear having a continuous non-circular pitch curve varying with respect to the periphery of the gear, and the points of tooth contact of the pinion teeth with the gear teeth at the pitch curve of the gear when joined together by a curve on the pinion, forming spaced continuous non-coincidental curves which vary for each revolution of the pinion until the gear has made a complete revolution, producing a speed change pattern varying for each revolution of the pinion until the gear has made a complete revolution and then repeating itself for each revolution of the gear.

20. In a varying speed gear train, a gear and a meshing pinion rotatable about fixed axes concentric with their centers, the tips of the teeth of said gear being formed with a circle concentric with the center of said gear, said gear having a continuous non-circular pitch curve varying with respect to the periphery of said gear, and the points of tooth contact of the pinion teeth with the gear teeth at the pitch curve of the gear, when joined together by a curve on the pinion, forming spaced continuous non-coincidental curves which vary for each revolution of the pinion until the gear has made a complete revolution, producing a speed change pattern varying for each revolution of the pinion until the gear has made a complete revolution and then repeating itself for each revolution of the gear.

21. A varying speed assembly including a circular pinion having an endless series of uniformly shaped teeth on the periphery thereof and rotatable about an axis, and a toothed member meshed with said pinion and movable therewith, said toothed member having a plurality of non-uniformly-shaped teeth, successive pairs of teeth on said member having varying pitches and successive teeth having varying addenda for varying the relative movement between said pinion and member.

22. A varying speed assembly including a circular pinion rotatable about an axis eccentric of its center and a toothed member meshed with said pinion and movable therewith, successive pairs of teeth on said member having varying pitches and successive teeth having varying addenda for varying the relative movement between said pinion and member.

23. A varying speed gear adapted to mesh with a uniform-toothed pinion, said gear having a plurality of non-uniform teeth being rotatable about a center and having, when rotated in mesh with the uniform teeth on said pinion, a continuous pitch curve spaced at different distances from the pinion-engaging periphery of the gear at different points about the latter.

24. A varying speed gear adapted to mesh with a pinion having a plurality of similar-shaped teeth, said gear being rotatable about a center and having a plurality of dissimilar-shaped teeth adapted to mesh with said pinion teeth and further having, when rotated in mesh with the pinion, a continuous pitch curve spaced at different distances from the roots of said gear teeth at different points about the toothed periphery of the gear.

25. A varying speed gear adapted to mesh with a pinion having a plurality of similar-shaped teeth, said gear being rotatable about a center and having a plurality of dissimilar-shaped teeth adapted to mesh with said similar-shaped pinion teeth and further having, when rotated in mesh with said similar-shaped pinion teeth, a continuous pitch curve which progressively varies in spacing relative to the tips of the gear teeth.

26. A varying speed gear adapted to mesh with a pinion having a plurality of like teeth, said gear being rotatable about a center and having a plurality of unlike teeth adapted to mesh with said like pinion teeth, along a continuous pitch curve, successive gear teeth varying in both pitch and addenda.

27. A varying speed gear adapted to mesh with a pinion having a plurality of like teeth, said gear being rotatable about a center and having a plurality of unlike teeth adapted to mesh with said like pinion teeth, along a continuous pitch curve, successive gear teeth varying in both pitch and dedenda.

28. A varying speed gearing including an inter-meshed gear and pinion rotatable about fixed axes, said pinion having a plurality of spaced continuous non-coincidental pitch curves and said gear having a single continuous non-circular pitch curve varying with respect to the periphery of the gear when said pinion and gear are driven together, thereby producing a speed change pattern between the gear and pinion.

29. A varying speed gearing including a standard pinion rotatable about a fixed axis and a gear meshing with and driven with said pinion and mounted for rotation about a fixed axis, said pinion having spaced continuous non-coincidental pitch curves and said gear having a non-circular continuous pitch curve varying with respect to the periphery of said gear when said gear and pinion are rotated in mesh, thereby producing a varying speed pattern which varies throughout each full revolution of said gear and is repeated for each successive revolution of said gear.

30. A drive combination of varying speed gears for producing a uniform speed from a varying speed including two meshing gears at least one of which has a circular periphery, the other of which has a continuous non-circular pitch curve varying with respect to its toothed periphery.

WILLIAM W. SLOANE.

REFERENCES CITED

The following references are of record in the file of this patent:

UNITED STATES PATENTS

| Number | Name | Date |
|---|---|---|
| 263,791 | Leclere | Sept. 5, 1882 |
| 1,142,051 | O'Connor | June 8, 1915 |
| 1,642,179 | Schurr | Sept. 13, 1927 |
| 2,303,558 | Wildhaber | Jan. 19, 1943 |
| 2,399,925 | Hewlett | May 7, 1946 |

FOREIGN PATENTS

| Number | Country | Date |
|---|---|---|
| 565,443 | Great Britain | Nov. 10, 1944 |